(12) United States Patent
Scotte et al.

(10) Patent No.: US 7,044,641 B2
(45) Date of Patent: May 16, 2006

(54) ROLLER TYPE LINEAR GUIDEWAY

(75) Inventors: Chen Scotte, Taichung (TW); Tsai Yu-Wen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 66 days.

(21) Appl. No.: 10/958,604

(22) Filed: Oct. 5, 2004

(65) Prior Publication Data

US 2006/0072862 A1    Apr. 6, 2006

(51) Int. Cl.
*F16C 29/06* (2006.01)

(52) U.S. Cl. ....................................... 384/44
(58) Field of Classification Search ................. 384/44, 384/43, 45; 464/168
See application file for complete search history.

(56) References Cited

U.S. PATENT DOCUMENTS 5,575,565 A * 11/1996 Takei et al. ................... 384/44
6,908,228 B1 * 6/2005 Dalessandro et al. ......... 384/44

* cited by examiner

*Primary Examiner*—Lenard A. Footland
(74) *Attorney, Agent, or Firm*—Charles E. Baxley

(57) ABSTRACT

The present invention relates to a roller type linear guideway which comprises the rail, the slide block, the roller-model, the recirculating-model, and the ender cap. The recirculating-model is make up of two half recirculating-models which are assembled together at a specific angle, and each of the half recirculating-models comprises two U-shaped recirculating piece which includes a return portion, a supporting portion and a reflow portion, the recirculating paths of the roller-models intersect to form a x-type turn. Therefore, there are no a lot of accessories, that can reduce time of fabrication and can save the cost of manufacture.

11 Claims, 8 Drawing Sheets

ROLLER TYPE LINEAR GUIDEWAY

BACKGROUND OF THE INVENTION

1. Field of the Invention

The present invention relates to a roller type linear guideway, linear guideway is widely used on machinery trade, automatic equipments, measuring machines, electronic instruments, and the likes. However, the roller type linear guideway is used on large machine.

2. Description of the Prior Arts

Linear guideway generally comprises a rail, a slide block mounted on the rail, and a plurality of rolling elements disposed between the slide block and the rail. If the rolling elements are cylindrical rollers, the guideway is called roller type linear guideway.

A rolling-element-circulating system of the roller type linear guideway generally comprises the rolling-element-retainer, the return path, the return unit, and etc. the circulating system of the roller type linear guideway is generally made up of a plurality of independent components or integrally formed by plastic ejection.

JP Patent 2002-54633 discloses a rolling-element circulating system which is made up of a plurality of independent components, wherein the rolling-element retainers 11, 12, 13, the return path 14 and the return unit (including 15a and 15b) are independent components. The respective independent components are not integral with the slide block 4, there are too many independent components, and thus the assembly is complicated and time-consuming.

JP Patent 7-317762 discloses a rolling-element circulating system that is made by integral plastic ejection, in which, the slide block 13 is used as a part of the plastic ejection mold, and then the rolling-element supporting structure (the structure 17 which is made up of 30, 31 and 32), the return path 10 and the return unit (16 and 19) are integrally formed by plastic ejection. If the slide block is big size, then the size of the corresponding mold should be large. Furthermore, the plastic ejection process needs to be controlled precisely, and the difficulties are relatively increased. In this case, the dimension tolerance of the slide block must be controlled precisely before plastic ejection, so that the slide bock can be fully fitted into the mold. In addition, the supporting structure is difficult to be produced since it has long and thin sidewalls.

The present invention has arisen to mitigate and/or obviate the afore-described disadvantages.

SUMMARY OF THE INVENTION

The primary object of the present invention is to provide a roller type linear guideway which can take the place of the ball type linear guideway. The contact surface (line-contact) of the roller is much larger than that of the rolling ball, the load capacity of the roller is accordingly larger than that of the rolling ball. Therefore, the roller type linear guideway is normally used on the large scale machine.

The roller type linear guideway in accordance with the present invention generally comprises: an elongated rail having four sliding surfaces, on the rail is mounted a slide block which is provided with four reflow passages and four sliding surfaces. Two half recirculating-models are inserted from both ends of the slide block with a specific angle so as to form a complete recirculating model. A roller mold is made up a plurality of roller and circulates in the recirculating model, and then two ender caps are assembled to both ends of the slide block.

In addition, the circulating mold is made up of a plurality of U-shaped half recirculating pieces, the half recirculating piece is integrally formed with a plurality of return blocks, supporting ribs and return half-tubes, each two half recirculating pieces are combined into a half recirculating-model, the half recirculating-model comprises a return portion, a supporting portion and a reflow portion, the return portion is connected between the supporting portion and the reflow portion, the return portion is provided with an outer return path and an inner return path, the recirculating-model is provided with two recirculating paths for the roller-model, the two recirculating paths intersect at the return portion to form a X-type turn, so that the roller-model will circulate in the recirculating paths and will change its direction through the X-type turn in the return portion. The inner return path of a half recirculating-model is connected with the supporting portion and the return portion of this half recirculating-model, and then is connected to the outer recirculating path of another half recirculating-model, so as to form a complete recirculating path.

In addition, the roller-model in accordance with the present invention can be made up of a plurality of rollers, or can be made up of a plurality of rollers and partitions, the partition can be a chain-like structure or can be a single structure.

The recirculating-model in accordance with the present invention is made up of a plurality of half recirculating pieces, therefore, it doesn't need a lot of accessories, so that the time of fabrication can be reduced and the manufacturing cost is saved.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
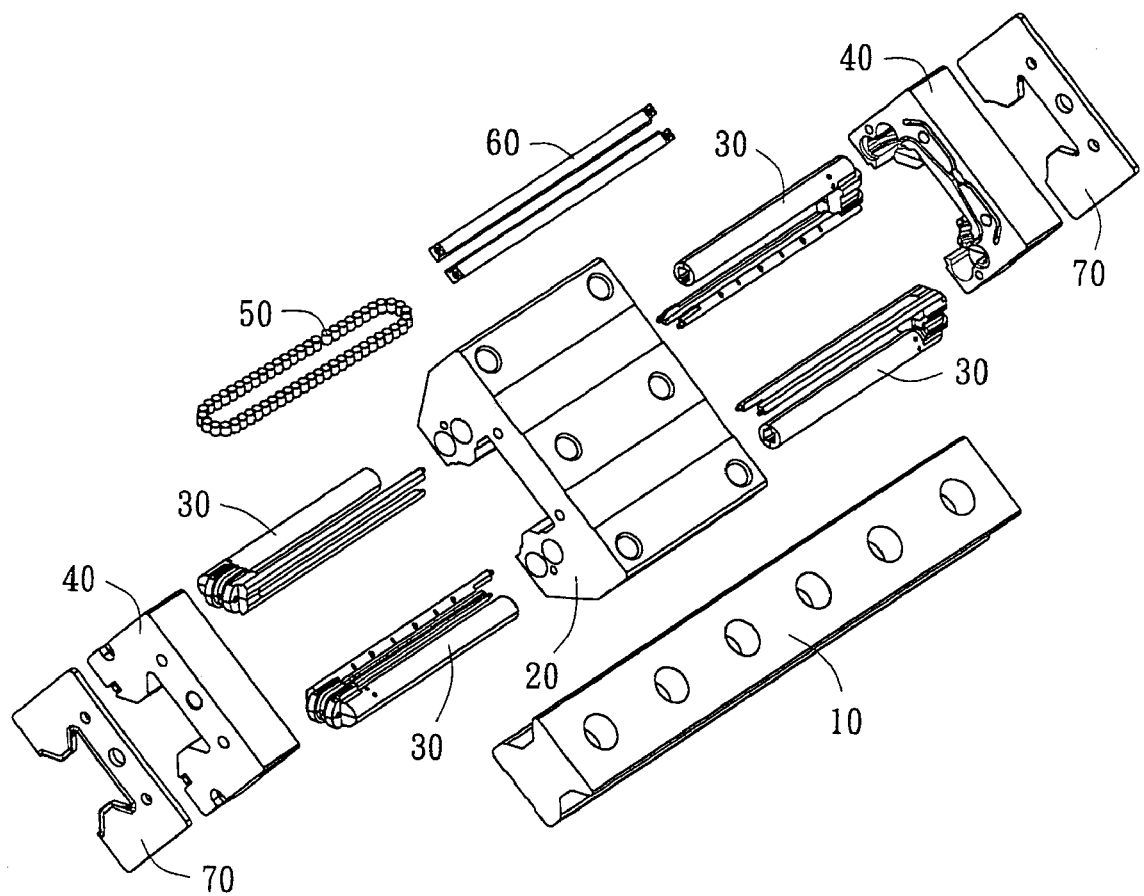
FIG. 1 is an exploded view of a roller type guideway in accordance with the present invention.
Figure 2:
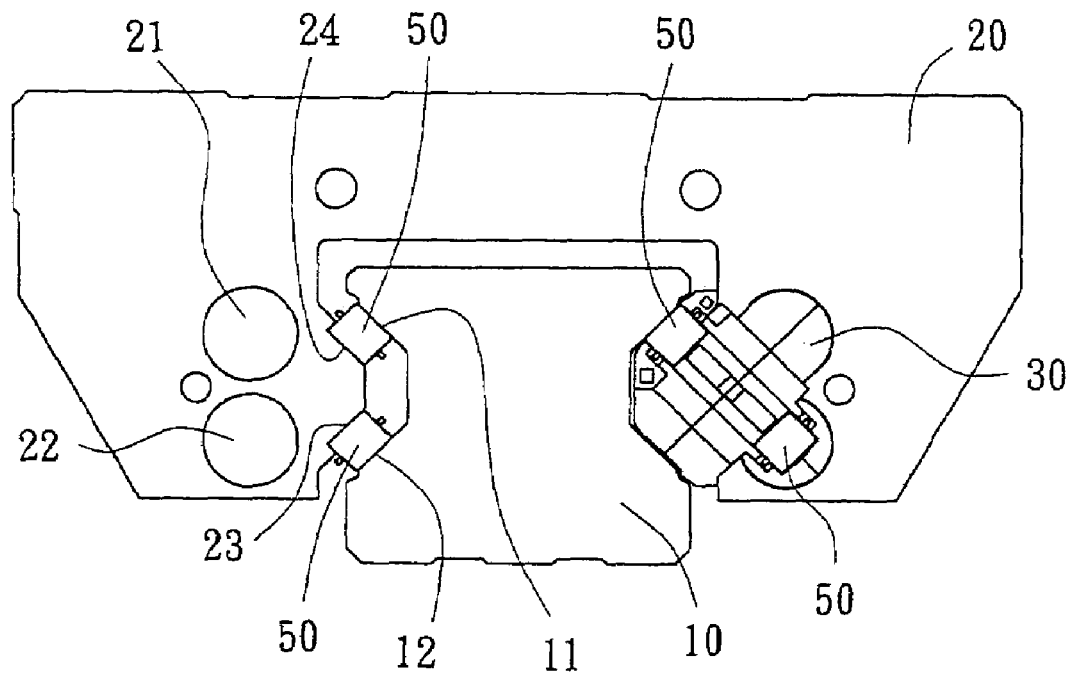
FIG. 2 shows an end surface of a roller type guideway in accordance with the present invention.

FIG. 1 is an exploded view of a roller type guideway in accordance with the present invention. FIG. 2 shows an end surface of a roller type guideway in accordance with the present invention, wherein the roller type guideway is not equipped with end cap. The roller type guideway comprises: a rail 10 which is an elongated structure having four sliding surfaces 11 and 12, a slide block 20 having four reflow passages 21, 22 and four sliding surfaces 23, 24, a pair of half recirculating-models 30, two ender caps 40, a roller-model 50 which is made up of a plurality of rollers, a dust-proof plate 60 and two end seals 70. The slide block 20 is mounted on the rail 10 and slides thereon, the sliding surfaces 11, 12 abut against the sliding surfaces 23, 24 of the slide block, and the roller-model 50 is disposed in the space defined by slide surfaces 11, 12 of the rail 10 and the slide surfaces 23, 24 of the slide block 20. The half recirculating-models 30 are inserted in the reflow passages 21, 22 of the slide block 20. The end caps 40 are assembled at both ends of the slide block 20, the dust-proof pieces 60 are installed in the clearances at the lower part of the slide block for preventing dust. The end seals 70 are disposed on the outer side of the ender caps 40 for stopping the dirty oil or dust on the rail 10 from entering into the slide block 20.

Figure 3:
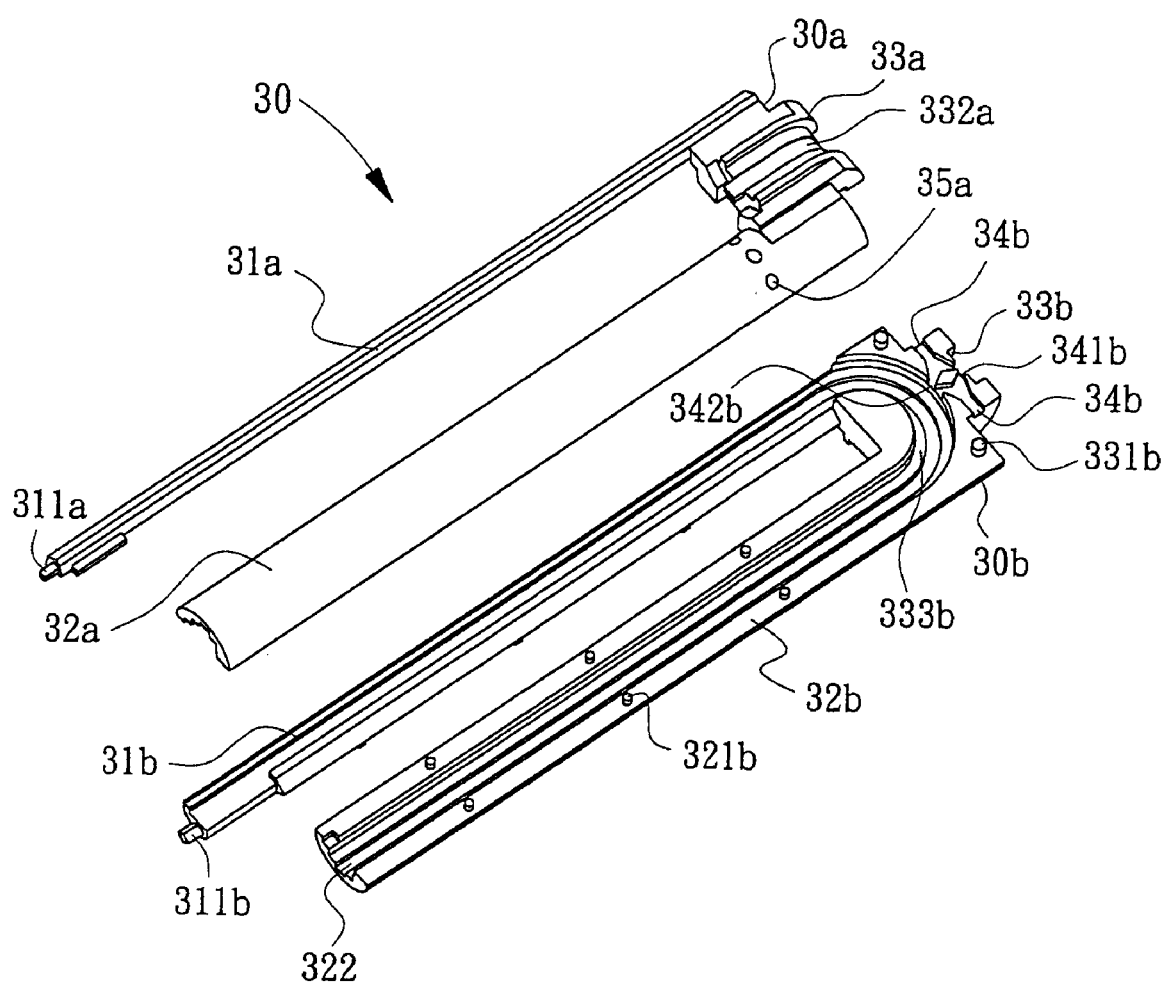
FIG. 3 is an exploded view for showing the half recirculating-model of the roller type linear guideway in accordance with the present invention.
Figure 4:
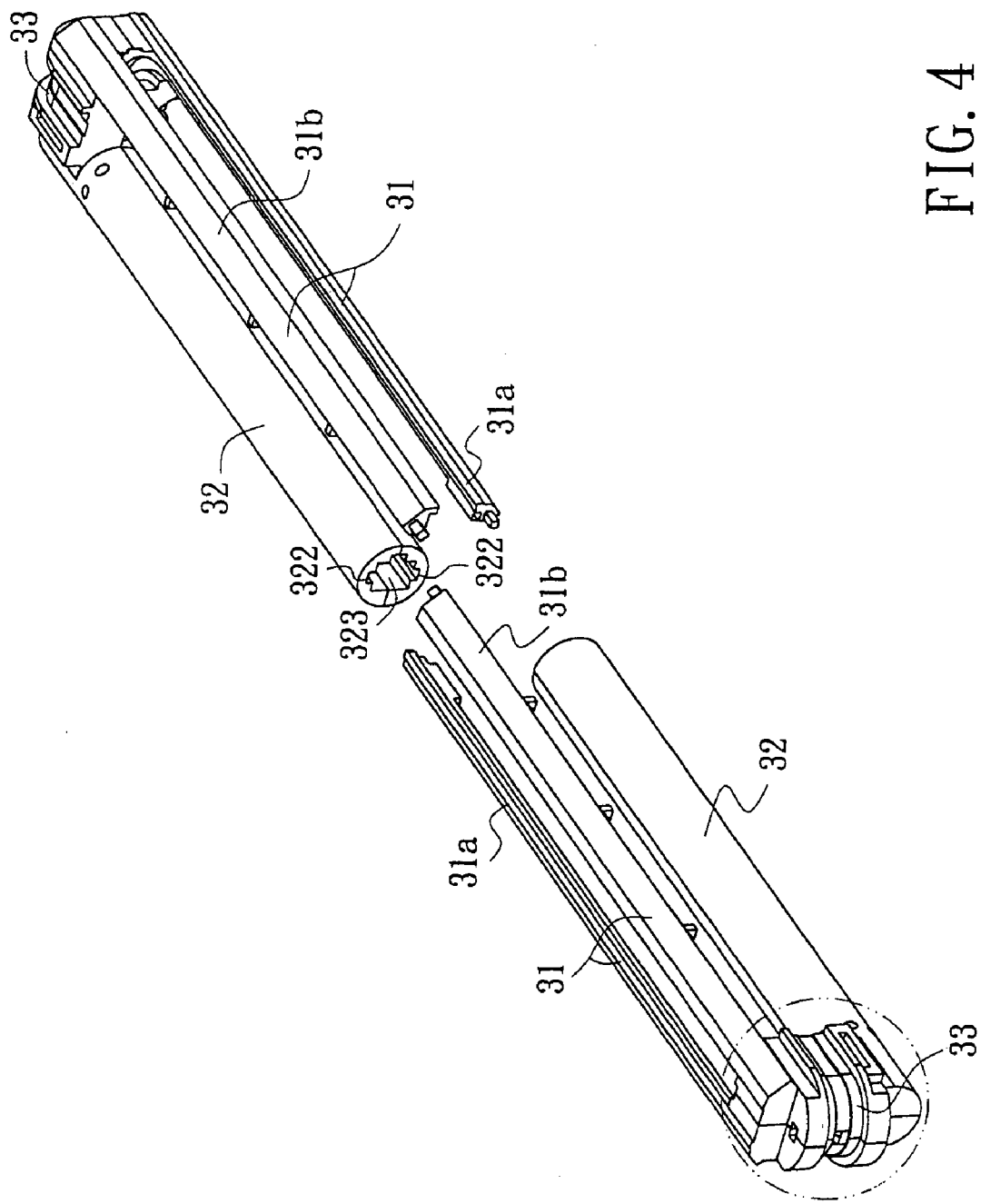
FIG. 4 is another exploded view for showing the half recirculating-model of the roller type linear guideway in accordance with the present invention.
Figure 5:
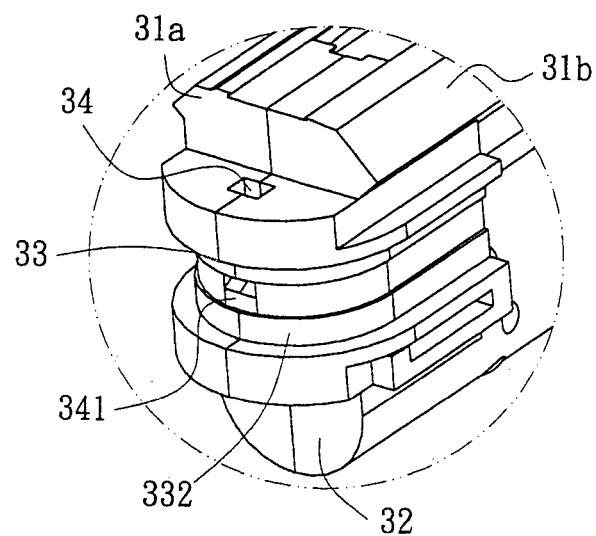
FIG. 5 is a partial amplified view of FIG. 4.

FIG. 3 is an exploded view for showing the half recirculating-model of the roller type linear guideway in accordance with the present invention. FIG. 4 is another exploded view for showing the half recirculating model of the roller type linear guideway in accordance with the present invention. FIG. 5 is a partial amplified view of FIG. 4. Each of the half recirculating-models 30 is made up of a pair of U-shaped half recirculating pieces 30a, 30b which are integrally formed with return blocks 33a, 33b, supporting ribs 31a, 31b and return half-tubes 32a, 32b. The return block 33a of the U-shaped half recirculating piece 30a is connected between the supporting rib 31a and the reflow half-tube 32a, and the return block 33b of the U-shaped half recirculating piece 30b is connected between the supporting rib 31b and the reflow half-tube 32b. The return blocks 33a and 33b are provided with inner return surfaces 333b and outer return surfaces 332a. The half recirculating model is provided with a groove 322 along the recirculating path of the roller type linear guideway for guiding the motion of the roller-model (not shown). The width of the groove 322 is larger than one third the diameter of the roller, and the half recirculating-model is further provided with an oiling groove 34b and oil scuppers 341b, 342b. An end of the supporting ribs 31a, 31b that is not connected to the return blocks 33a, 33b is provided with a fixing pin 311a, 311b, respectively. After the two half recirculating pieces 30a and 30b are combined together through the positing pins 321b, 331b and the locating holes (not shown), the supporting ribs 31a, 31b will be combined into a supporting portion 31, the reflow half-tubes 32a and 32b will be combined into a reflow portion 32, and the return blocks 33a and 33b will be combined into a return portion 33. On the outer surface of the reflow portion 32 are provided a plurality of projections 35a which are to be inserted in the reflow passages 21, 22 of the slide block 20 and serve as a positioning means. A recirculating space 323 is defined in the reflow portion 32 for circulation of the roller-model (not shown). The return portion 33 is provided with an inner return path (not shown) that is made up of inner return surfaces 333b, an outer return path 332 that is made up of outer return surfaces 333a, an oiling entrance 34 made up of the oiling grooves, an outer drainage port 341 made up of the oil currages 341b, and an inner drainage port (not shown) made up of oil scuppers 342b. The lubricant oil, after entering the oiling entrance 34, will flow via the outer drainage port 341 to the inner and the outer return path so as to lubricate the roller-model. In addition, the two half recirculating-models 30 are inserted from both ends of the slide block 20 with a specific angle of 90 degrees so as to form a complete recirculating-model.

Figure 6:
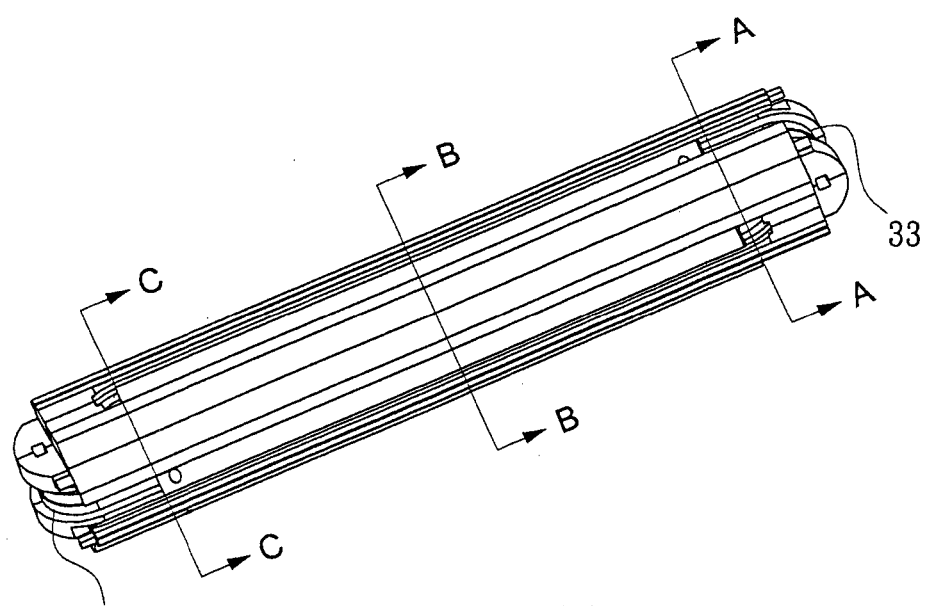
FIG. 6 is a perspective assembly view of a complete recirculating-model of FIG. 4.
Figure 7:
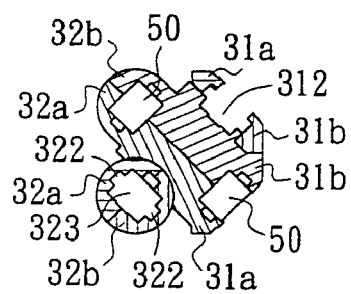
FIG. 7 is a cross sectional view taken along the line of A—A of FIG. 7.
Figure 8:
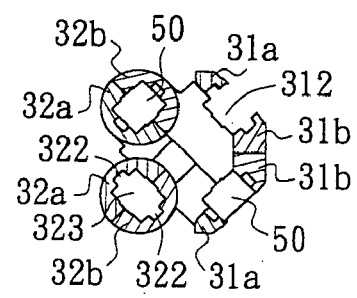
FIG. 8 is a cross sectional view taken along the line of B—B of FIG. 6.
Figure 9:
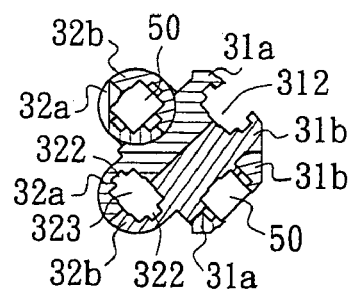
FIG. 9 is a cross sectional view taken along the line of C—C of FIG. 6.

FIG. 6 is a perspective assembly view of a complete recirculating-model of FIG. 4. FIG. 7 is a cross sectional view taken along the line of A—A of FIG. 7. FIG. 8 is a cross sectional view taken along the line of B—B of FIG. 6. FIG. 9 is a cross sectional view taken along the line of C—C of FIG. 6. The roller mold 50 comprises a plurality of rollers and chain-like partition, the recirculating-model is provided with two recirculating paths for the reception of the roller-model 50, wherein one of the recirculating paths is accommodated with a roller-model 50 and the other of the recirculating paths is not accommodated with the roller-model 50. The reflow space 325 is made up of the two half reflow tubes 32a and 32b, the slide space 312 is made up of the two supporting ribs 31a and 31b, and the groove 322 serves for guiding the partitions among the roller-model 50 (not shown). As shown in FIG. 7, which is a cross sectional view of showing the right side of the return portion of the recirculating-model, the recirculating path accommodated with the roller-model 50 extends from the inner return path (not shown) of the right side of the recirculating-model, and changes from load condition (or circulating condition) to circulating condition (or load condition). However, the recirculating path without the roller-model 50 is the outer return path 332 of another half recirculating-model which is located at the right side of the recirculating-model. The two lines of recirculating paths intersect at the return portion 33 to form a X-type turn, so that the roller-model 50 is able to circulate in the recirculating path and to change its direction through the X-type turn of the return portion. With reference to FIG. 9, which is a cross sectional view of showing the left side of the return portion of the recirculating-model, the recirculating path accommodated with the roller-model 50 extends from the inner return path (not shown) of the left side of the recirculating-model, and changes from load condition (or circulating condition) to circulating condition (or load condition). However, the recirculating path without the roller-model 50 is the outer return path 332 of another half recirculating-model which is located at the left side of the recirculating-model. The two lines of recirculating paths intersect at the return portion 33 to form a X-type turn, so that the roller-model 50 is able to circulate in the recirculating path and to change its direction through the X-type turn of the return portion.

Figure 10:
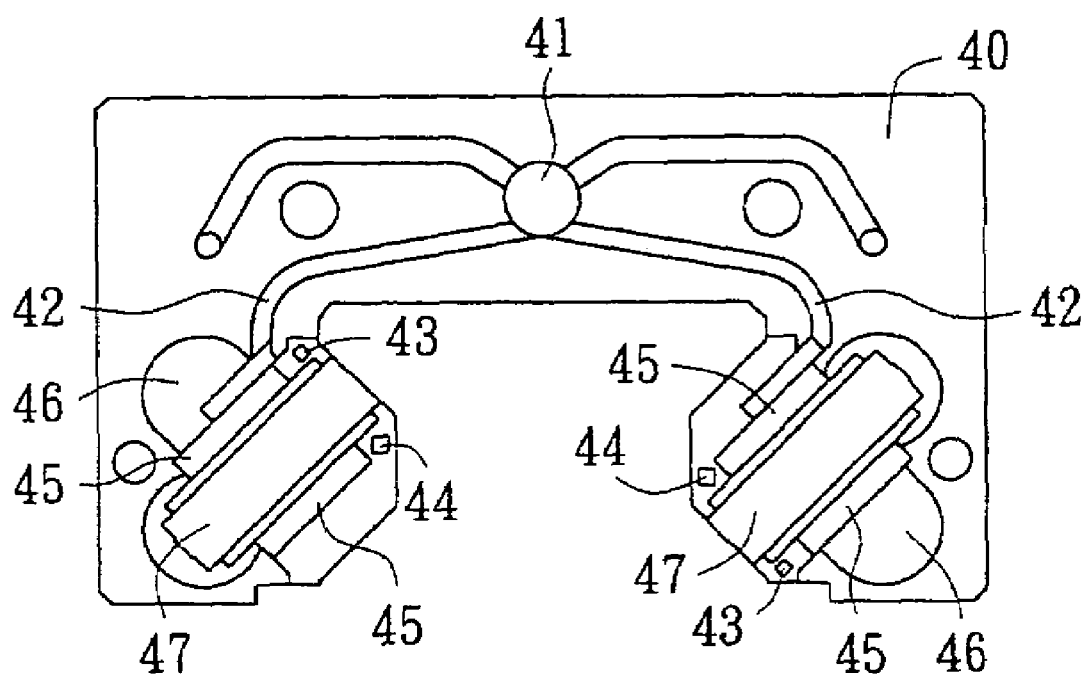
FIG. 10 is a cross sectional view of the end cap of FIG. 1.

FIG. 10 is a cross sectional view of the ender cap of FIG. 1. The ender caps 40 are assembled to both ends of the slide block 20 of FIG. 1, each of the ender caps 40 is provided with a return curve-surface 47 which is used to cooperate with the outer return path 332 of the half recirculating-model 30 in FIG. 5, so as to prevent the roller-model 50 from being fallen off the recirculating path when passing through the outer return path 332. The ender caps 40 are further provided with a plurality of fixing holes 43, 44 which are employed to position the supporting ribs 31a, 31b by cooperating with the fixing pins 311a, 311b. A plurality of grooves 46 are formed on the ender caps 40 for cooperating with the reflow portion 32 of the half recirculating-model 30. To improve the lubricating effect, an oiling aperture 41 is formed on each of the ender caps 40 and connected to both sides of the ender caps 40 via oilways 42. At the end of the oilways 42 are provided oil spaces 45 for cooperating the oiling entrance 34 on the return portion 33 of the half recirculating-model 30, so that the lubrication can be poured into oiling aperture 41 and flows to the oil spaces 45 via the oilways 42, and then flows to the oiling entrance 34 of the half recirculating-model 30 for lubricating the roller-model (not shown).

Figure 11:
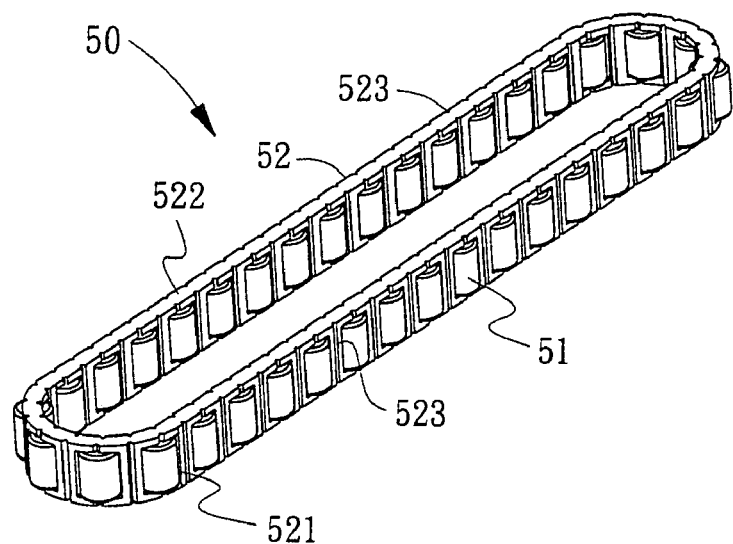
FIG. 11 is a roller-model in accordance with another embodiment of the present invention.
Figure 12:
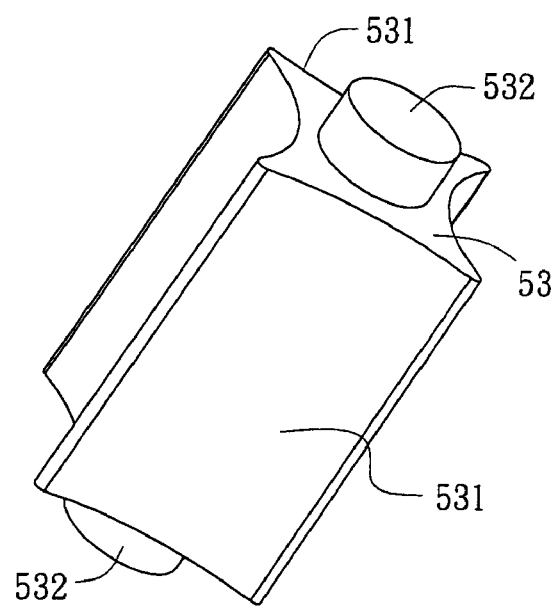
FIG. 12 is a partition of the roller-model of FIG. 11.

FIG. 11 is a roller-model in accordance with another embodiment of the present invention. FIG. 12 is a partition of the roller-model of FIG. 11. The roller-model 50 comprises a plurality of rollers 51 and the partitions 52, 53. The partition 52 is a chain-like structure which is made up of a plurality of spacing portions 521 and a chain 522, the rollers 51 are separated from one another by the spacing portions 521 and linked together by the chain 522. A plurality of troughs 523 are formed on the chain structure for enabling the roller mold to change moving direction during circulation. Another type partition 53 is a one-piece structure comprised of a spacing portion 531 and a pin portion 532 and serves to separate the rollers 51.

While we have shown and described various embodiments in accordance with the present invention, it should be clear to those skilled in the art that further embodiments may be made without departing from the scope of the present invention.

What is claimed is:

1. A roller type linear guideway at least comprising:
   an elongated rail having four sliding surfaces;
   a slide block having four reflow passages and four sliding surfaces, the slide block is mounted on the rail and slides thereon;
   a roller-model made up of a plurality of rollers;
   a recirculating-model made up of a plurality of U-shaped half recirculating pieces, wherein the half recirculating piece is integrally formed with a plurality of return blocks, supporting ribs and return half-tubes, each two half recirculating pieces are combined into a half recirculating-model, the half recirculating-model comprises a return portion, a supporting portion and a reflow portion, the return portion is connected between the supporting portion and the reflow portion, the return portion is provided with an outer return path and an inner return path, two half recirculating-models are inserted from both ends of the slide block with a specific angle so as to form a complete recirculating-model, the recirculating-model is provided with two recirculating paths for the roller-model, the two recirculating paths intersect at the return portion to form a X-type turn, so that the roller-model will circulate in the recirculating paths and will change its direction through the X-type turn in the return portion;
   two end caps assembled at both ends of the slide block, wherein each of the ender caps is provided with a return curve-surface which is used to cooperate with the outer return path of the half recirculating-model, so as to prevent the roller-model from being fallen off the recirculating path when passing through the outer return path.

2. The roller type linear guideway as claimed in claim 1, wherein the inner return path of a half recirculating-model is connected with the supporting portion and the return portion of this half recirculating-model, and then is connected to the outer recirculating path of another half recirculating-model, so as to form a complete recirculating path.

3. The roller type linear guideway as claimed in claim 1, wherein the specific angle between the two half recirculating-models is 90°.

4. The roller type linear guideway as claimed in claim 1, wherein the return portion of the half recirculating-models is provided with an oiling entrance, an outer drainage portion, so that lubrication is allowed to be poured into the recirculating-model and flows to the inner and the outer return paths for lubricating the roller-model.

5. The roller type linear guideway as claimed in claim 1, wherein the roller-model comprises a plurality of rollers and a partition, the partition serves to separate the rollers from one another.

6. The roller type linear guideway as claimed in claim 5, wherein the partition of the roller-model is a chain-like structure comprising spacing portions and a chain, the rollers are separated from one another by the spacing portions and linked together by the chain.

7. The roller type linear guideway as claimed in claim 6, wherein a groove is formed on the return portion, the supporting portion and the reflow portion of the half recirculating-models and located along the recirculating path for guiding the partion of the roller-model.

8. The roller type linear guideway as claimed in claim 5, wherein a groove is formed on the return portion, the supporting portion and the reflow portion of the half recirculating-models and located along the recirculating path for guiding the motion of the partion of the roller-model.

9. The roller type linear guideway as claimed in claim 5, wherein the partition of the roller-model is a one-piece structure comprised of a spacing portion and a pin portion.

10. The roller type linear guideway as claimed in claim 9, wherein a groove is formed on the return portion, the supporting portion and the reflow portion of the half recirculating-models and located along the recirculating path for guiding the partion of the roller-model.

11. The roller type linear guideway as claimed in claim 5, wherein a plurality of projections are provided on the outer surface of the reflow portion and employed to be inserted in reflow passages of the slide block for producing a locating effect.

* * * * *